P. F. QUINLAN, Jr.
REGISTER DIAL.
APPLICATION FILED APR. 29, 1921.
1,424,518.
Patented Aug. 1, 1922.
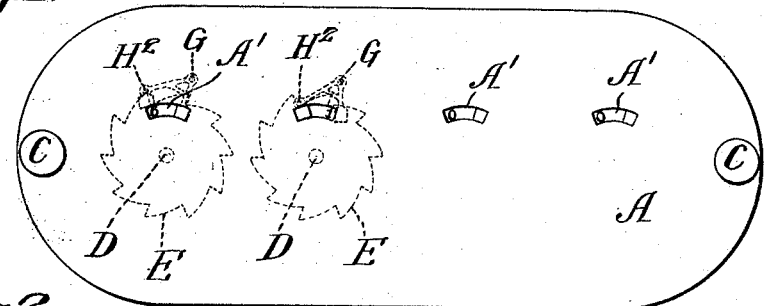
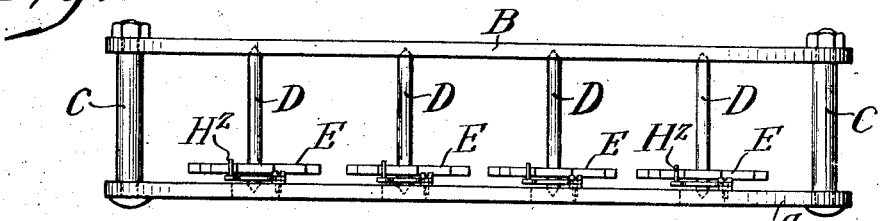
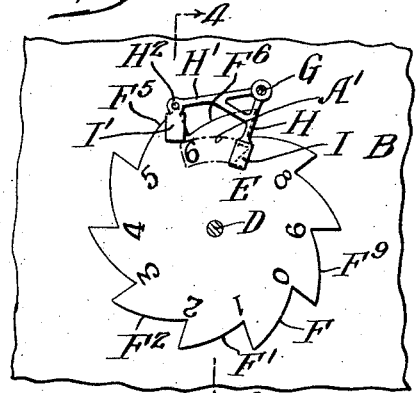 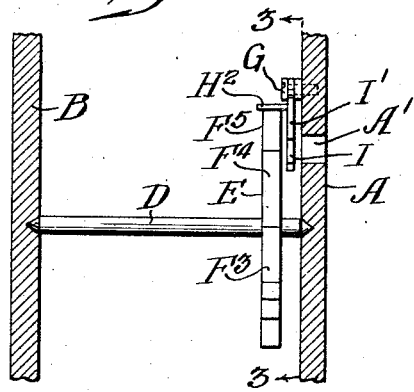
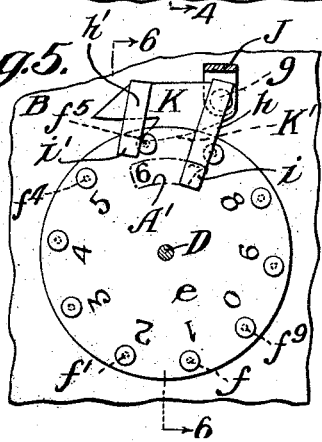
Inventor:
Paul F. Quinlan Jr.
by
his Attorney.

UNITED STATES PATENT OFFICE.

PAUL F. QUINLAN, JR., OF ELKINS PARK, PENNSYLVANIA.

REGISTER DIAL.

1,424,518.  Specification of Letters Patent.  Patented Aug. 1, 1922.

Application filed April 29, 1921. Serial No. 465,376.

*To all whom it may concern:*

Be it known that I, PAUL F. QUINLAN, Jr., a citizen of the United States of America, and resident of Elkins Park, in the county of Montgomery, State of Pennsylvania, have invented a certain new and useful Improvement in Register Dials, of which the following is a true and exact description, reference being had to the accompanying drawings, which form a part thereof.

My invention relates to register dials of the kind commonly used in connection with meters in which a series of progressively moving dials are used, each carrying evenly disposed figures which come progressively into registry with the sight holes formed in the dial plate. In such apparatus it is obviously desirable that the sight holes should be long enough to display two of the figures on a dial but obviously as long as both figures remain in sight there is a risk of a misreading of the register and the object of my invention is to provide a register dial of the general character described with a simple, light and effective shutter device which will screen the advancing figure on the dial until it is in full registry with the sight hole and then move exposing this figure and screening the figure immediately in advance before it has moved out of registry with the sight hole.

The nature of my improvements will be best understood as described in connection with the drawings in which—

Figure 1 is a face view of the dial plate with some of the dials and shutter actuating mechanism shown in dotted lines.

Figure 2 is a plan view.

Figure 3 is an enlarged view taken on the line 3—3 of Fig. 4.

Figure 4 is a side elevation of the mechanism shown in Fig. 3, with the dial plate sectioned as on line 4—4, of Fig. 3.

Figure 5 is a side elevation of a modified form of my device taken as on the line 5—5, of Fig. 6, and Figure 6 is a side elevation of the mechanism shown in Fig. 5 in a section taken through the dial plate on the line 6—6 of Fig. 5.

A is the dial plate having formed in it a series of slot-like sight holes A', A', etc. each of sufficient length to display two of the numbers of a dial. B indicates the back plate of the meter or register secured to the dial plate by stud C, C. D, D, are shafts the ends of which have bearings in the plates A and B and which shafts are, of course, connected with and actuated by the gears of the meter which may be of any ordinary character and are not shown in the drawing. E, E, E, are dials secured to shafts D and each, in my preferred form and construction, illustrated in Figs. 1 to 4, formed with peripheral cams, one corresponding to each of the figures on the dial and indicated at F', F², etc. The form given to these cams is such as will impart to the shutters hereafter to be described, the necessary movement to effect the purpose which I have in view. G, G, etc. are pivot pins secured to the face plate A and on which are pivoted the arms H and H' carrying respectively the shutters I and I'. H² is a pin extending laterally from the arm H' and resting on the cammed periphery of the disk E. The form of the cams and disposition of the shutters must be in effect as illustrated in the drawings so that as an advancing figure, 7, as shown, moves into the sight hole H' it is covered by the shutter I while at the same time the shutter I is elevated so that the receding figure, 6, as shown, is fully exposed while immediately after the full registry of the figure 7 with the sight hole the pin H² falls from the point of the receding cam F⁵ at once to the bottom of the advancing cam F⁶ with the effect of covering the figure 6 by the shutter F' and shifting the shutter I to fully expose the figure 7. The form of the cams is also such that as the advancing figure 7 for instance, moves along the sight hole the shutter I' is raised so that when the figure reaches the left hand side of the sight hole the shutter is naturally retracted and the shutter I moved into registry with the left hand of the sight hole so as to obscure the advancing figure 8, for instance, until it is fully in registry with the sight hole.

In a modified construction shown in Figs. 5 and 6 the number disks instead of carrying cams are provided with cam contacting pins indicated at $f, f$, etc. and a cam K pivoted at $g$ on bracket J rides on these pins and carries arms indicated at $h$ and $h'$ which in turn carry shutters $i$ and $i'$ which operate in connection with the numbered disk and the elongated sight hole A' exactly as in the first described construction. The modified structure is obviously an important invention and fully equivalent to that previously described.

Having now described my invention, what

I claim as new and desire to secure by Letters Patent, is:

In a meter dial comprising two or more numbered rotating disks and a dial plate having sight openings formed through it for the display of the numbers in certain positions of the disks, the improvement which consists in forming the sight opening in the dial of such a length as to display two numbers on a disk in one position of the disk, providing on each disk a series of shutter actuating cams corresponding in number to the numbers on the disk and combining therewith a pair of shutters for each disk plate, said shutters moving on a common pivot and having a cam contacting portion acted on by the cams on the numbered disks in connection with which the shutters operate as described and so that one shutter covers a number moving into registry with the sight hole until it has passed fully into said sight hole, the other shutter during this period being retracted from the sight hole, and after the said number has so fully registered with the sight hole the cam rapidly shifts the shutters so that the one uncovers the advancing number and the other covers the receding number.

PAUL F. QUINLAN, Jr.